(No Model.)

L. W. WOOD.
FASTENER FOR LACINGS.

No. 353,524. Patented Nov. 30, 1886.

Witnesses:

Inventor
Leander W. Wood.
By Emma Hle
Atty.

United States Patent Office.

LEANDER W. WOOD, OF FONTANELLE, IOWA.

FASTENER FOR LACINGS.

SPECIFICATION forming part of Letters Patent No. 353,524, dated November 30, 1886.

Application filed September 24, 1886. Serial No. 214,466. (No model.)

*To all whom it may concern:*

Be it known that I, LEANDER W. WOOD, a citizen of the United States, residing at Fontanelle, in the county of Adair and State of Iowa, have invented certain new and useful Improvements in Fasteners for Lacings; and I do hereby declare that the following is a full, clear, and exact description of the invention, which will enable others skilled in the art to which it appertains to make and use the same.

My invention relates to lace-fasteners; and it consists in the construction and arrangement of the parts of the same, which will be more fully hereinafter described, and pointed out in the claims.

One object of my invention is to provide a lace-fastener which will not form any projections which would be liable to catch upon anything with which it comes into contact, and one which is easily operated in securing the lace, thereby rendering it of practical use in the light as well as in the darkness.

A further object of my invention is to provide a lace-fastener which is an independent fastener in itself, so that if one of the fasteners should become accidentally unfastened the lace would still be retained by the remaining fasteners, which is accomplished by means which are simple and effective in their construction, readily understood and operated, and cheaply manufactured.

I obtain these objects by the device illustrated in the accompanying drawings, wherein like letters of reference indicate similar parts in the several views, and in which—

Figure 1:
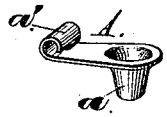
Figure 2:
Figure 3:
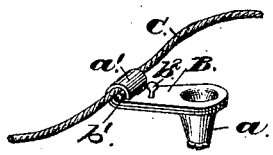
Figure 4:
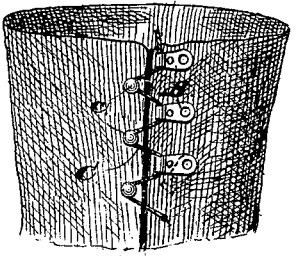

Figure 1 represents a perspective view of the lower portion of the fastener; Fig. 2, a like view of the upper portion thereof; Fig. 3, a like view of the two parts shown in Figs. 1 and 2 united, and a portion of the lace shown in connection therewith. Fig. 4 represents a perspective view of a portion of a glove with my improved fasteners shown mounted thereon.

A represents the lower portion of the fastener, which is stamped out of sheet metal by suitable means, and formed with an extended eyelet, $a$, at one end, and the rear part rolled upon the main body of this portion of the fastener to form an open loop, $a'$.

The top portion, B, of the fastener is formed in a similar manner as the portion A, with an extended eyelet, $b$, and a bent-up loop, $b'$, and in addition has a stud or small knob, $b^2$, near the rear portion thereof, for a purpose which will be more fully hereinafter described. The eyelet $b$ and loop $b'$ of the portion B are constructed of somewhat smaller dimensions than the eyelet $a$ and loop $a'$ of the portion A, so that the said portion B may be readily fitted into the portion A.

In applying my improved fastener to a desired article upon which it is adapted to be used—for illustration, a glove, as shown in Fig. 4—the lower portion, A, is secured to one side of the opening of the glove by means of the eyelet $a$ thereof being inserted through an aperture therein, and swaged over by means of a suitable punch. The portion B is then set in the portion A, the eyelet $b$ thereof fitting in the eyelet $a$, and the loop $a'$ engaged by the loop $b'$, and when the said parts have been thus arranged the loop $b'$ is in like manner swaged in connection with and under the loop $a'$ by means of a suitable punch, and secured thereto to such a degree of tightness as to allow a pivotal movement of the portion B of the fastener upon the fastener A, thereby allowing said portion B to open and close on the portion A. On the side opposite to that to which the fasteners are applied on a glove suitable lace-buttons $c$ may be used, arranged at predetermined regulated intervals.

In lacing a glove, the portions B are opened from the parts A by means of the studs or knobs $b^2$, as shown in dotted lines in Fig. 4, until the loop $b'$ passes out of the loop $a'$, thereby leaving the said loop $a'$ open and clear for the reception of the lace C, which is passed through the loops $a'$ and over the buttons $c$ alternately. As the said lace C is passed through each of the loops $a'$ the portions B are closed upon the portions A by means of the knobs $b^2$, the lace being firmly held in between the two loops $a'$ and $b'$, which are now closed. The glove-opening is thus securely held together, and should the lace break the independent securing action of each fastener would still retain the lace at the unbroken part.

In unfastening the glove or removing the lace, the portion B is opened by means of the stud or knob $b^2$, and the lace easily and readily detached from the fasteners.

I am aware that prior to my invention a fastener has been used having an attaching-eye similar to my device, and such I do not broadly claim; but What I do claim as new, and desire to secure by Letters Patent, is—

1. As an improved article of manufacture, a lace-fastener consisting of two plates, one mounted upon and pivotally connected to the other by means of eyelets struck therefrom or secured thereto, and loops formed on opposite ends of each plate fitting and operating in relation to each other, substantially as described.

2. In a lace-fastener, the combination of a lower portion, A, having an eyelet, $a$, and loop $a'$, a portion, B, having an eyelet, $b$, and a loop, $b'$, mounted upon and pivotally connected to the portion A, the parts of the portion B engaging with and fitting in the like parts of the portion A, and a stud or knob, $b^2$, for operating the device, substantially as described.

LEANDER W. WOOD.

Witnesses:
M. M. YOUNG,
JAY SULLIVAN.